United States Patent [19]

Halabiya

[11] 4,418,923
[45] Dec. 6, 1983

[54] ENGINE OIL PASSAGE SEAL

[75] Inventor: Sabah Halabiya, Rheinhausen, Fed. Rep. of Germany

[73] Assignee: Deere & Company, Moline, Ill.

[21] Appl. No.: 464,164

[22] Filed: Feb. 7, 1983

[30] Foreign Application Priority Data

Feb. 15, 1982 [EP] European Pat. Off. ........ 82300738.0

[51] Int. Cl.³ ............................ F16J 9/00; F16J 15/12
[52] U.S. Cl. .................................. 277/167.5; 277/190
[58] Field of Search ...................... 277/167.5, 190, 191

[56] References Cited

U.S. PATENT DOCUMENTS

| 480,943 | 8/1892 | Bodfish | 277/190 |
| 3,918,725 | 11/1975 | Dryer | 277/167.5 |
| 4,384,728 | 5/1983 | Koltookian | 277/167.5 |

FOREIGN PATENT DOCUMENTS 1792809 3/1959 Fed. Rep. of Germany.

Primary Examiner—Robert I. Smith

[57] ABSTRACT

An oil seal is formed between two casing parts which have oil passages which are joined by a hollow dowel. A sealing ring surrounds the dowel and is compressed between the casing parts. In order to allow relatively loose fitting dowels and appreciable tolerances in the spacing between the passages and the gap between casing parts, the sealing ring has the form of two annular webs which are pressed together as the casing parts are clamped together. Moreover, one web has a frustoconical surface which engages a frustoconical countersunk surface in one of the casing parts. In a modified embodiment, the oil pressure is communicated to the space below the webs and spreads these into pressure contact with the casing parts.

8 Claims, 3 Drawing Figures

ENGINE OIL PASSAGE SEAL

BACKGROUND OF THE INVENTION

The present invention relates to an engine oil passage seal of the type comprising a hollow dowel connecting oil passages in two casing parts and a sealing ring compressed around the dowel between the two casing parts.

Such seals are in common use in automobile and other engines. The hollow dowels serve both to locate the casing parts and to complete oil passages between the casing parts while the sealing rings prevent oil leaking out between the casing parts. The known seals use ordinary O-rings. Although these are cheap, they do not provide a satisfactory seal unless they are correctly and uniformly compressed. For this reason, it is necessary to maintain very close tolerances on the relative positions of the dowel holes in the casing parts (and on any gap between the casing parts when fitted together) and to use close fitting dowels. Since there are normally several dowels between two casing parts, this makes it difficult to fit the parts together and to separate the parts. There is a risk, if parts are not offered up and taken off squarely, that the dowels and/or O-rings will be damaged, leading to oil leaks.

SUMMARY OF THE INVENTION

An object of the present invention is to provide a hollow dowel-type seal in which loosely fitting dowels and relaxed tolerances are permitted.

This and other objects are achieved by the present invention which includes a sealing ring which has two annular webs meeting at their outer peripheries and which cooperate with the two casing parts, respectively. One web has a frustoconical outer surface engaged in a frustoconical countersink in the corresponding casing part.

The combination of these two features enables the sealing ring to establish good sealing contact with both casing parts and to center itself correctly by virtue of the mating frustoconical surfaces. Moreover, this allows the use of relatively loosely fitting dowels and thereby relaxes the tolerances on the positioning of the dowel holes.

According to a first embodiment of the invention, the compressed sealing ring grips the hollow dowel and sealing pressure against both casing parts is created by the clamping forces between these parts. The ring can be regarded as a thick, solid washer of elastomeric material chamfered around one edge to provide the frustoconical surface and internally, circumferentially grooved to provide the two webs. (Although this is a description of its form and not the way in which it is made, such a ring will be produced by a molding operation.)

According to a second embodiment of the invention, where the operating oil pressure in the passage is continually high, advantage is taken of this pressure to urge the webs of the sealing ring against the two casing parts. There may be enough leakage past the hollow dowel to achieve this without special measures, but it is preferred to provide a hole through the wall of the dowel part way along its length.

DETAILED DESCRIPTION

Figure 1:
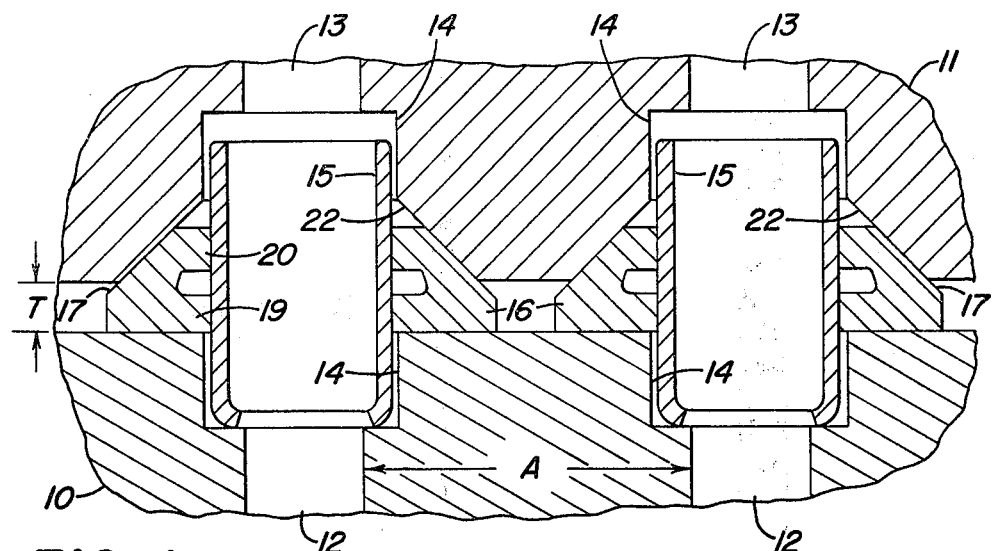
FIG. 1 is a sectional view of two oil passage seals according to the first embodiment.

FIG. 1 shows, in fragmentary fashion, two casing parts 10 and 11. As an example of specific application, the part 10 may be an automobile gear casing housing, for example, a high and low speed range selector gear. The casing part 11 is a control valve housing containing the control valve for the range selector gear. This valve has four connections to the gear and, in order to enable these to be completed by blind fixing of the casing part 11 to the casing part 10, use is made of hollow dowel oil passage seals. Only two of the four seals are shown in FIG. 1 and they are provided between passages 12 in the casing part 10 and passages 13 in the part 11. The passages 12 and 13 are counterbored at 14 to receive hollow dowels 15 which, in accordance with well-known practice, fit partially into the casing part 10 and partially into the casing part 11. In contrast to the prior art, the dowels 15 are relatively loose fits in the sockets provided by the counterbores 14 so there is no difficulty in fitting together or separating the casing parts 10 and 11.

Figure 2:
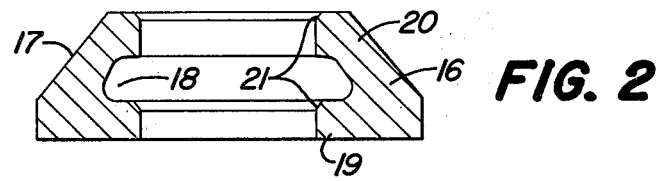
FIG. 2 is a sectional view of an uncompressed sealing ring for the first embodiment.

Each hollow dowel 15 is surrounded by a sealing ring 16, one of which is shown in uncompressed state in FIG. 2. The ring is made of an oil-resistant synthetic rubber and has the general form of a thick washer with a substantial chamfer around one edge providing a frustoconical surface 17. Internally, the bore of the washer-like sealing ring 16 is provided with a circumferential groove whereby the sealing ring has two annular webs 19 and 20. Internal corners 21 are lightly chamfered to facilitate insertion of the dowel 15.

The counterbores 14 in the casing part 11 (FIG. 1) are also countersunk to provide frustoconical surfaces 22 which mate with the frustoconical surfaces 17 of the sealing rings 16. The sealing rings are accordingly automatically centered, with the dowels 15 fitted therein. The spacing "A" between passages 12 or 13 does not have to be established with a very precise tolerance. Moreover, pressure between the casing parts 10 and 11 tends to close the sealing ring webs 19 and 20 towards each other, closing up the groove 18, as is apparent by comparing FIG. 2 with FIG. 1, and good sealing contact under adequate pressure is achieved against both casing parts without any risk of overcompressing the sealing rings. The gap "T" between the two casing parts is also therefore not critical and an appreciable tolerance is acceptable.

Figure 3:
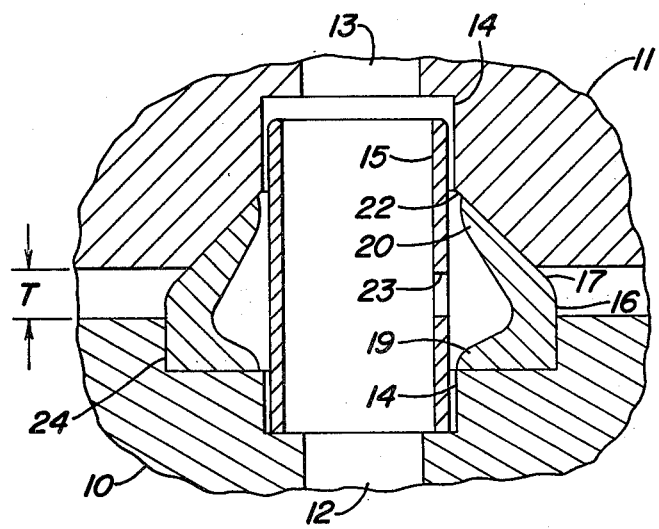
FIG. 3 is a sectional view of the second embodiment.

In the second embodiment illustrated in FIG. 3, the sealing ring 16 has a generally "V" cross-section with the webs 19 and 20 diverging from each other. The pressurized oil in the passages 12, 13 acts in the V section annular chamber within the sealing ring and urges the webs against the casing parts 10 and 11. To assist in this respect, a hole 23 is provided through the wall of the hollow dowel 15 so that the oil pressure can act without impediment against the inside of the sealing ring. In this embodiment, the sealing ring does not grip the hollow dowel 15 at all. On the one hand, the frustoconical surface 17 of the sealing ring engages in the frustoconical surface 22 of the casing part 11. On the opposite side, the sealing ring 16 is externally cylindrical and is received in a second counterbore 24 in the casing part 10.

In both embodiments, it is possible to provide both webs with frustoconical outer surfaces engaged in countersinks in the two casing parts. In the case of the first embodiment, however, it is preferred to have the second web 19 flat against the flat surface of the corresponding casing part 10.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. An engine oil passage seal of the type comprising a hollow dowel connecting oil passages in two casing parts and a sealing ring compressed around the dowel between the two casing parts, characterized in that the sealing ring has first and second annular webs which are joined at their outer peripheries, each web sealingly engaging a corresponding one of the two casing parts and at least the first web having a frustoconical outer surface which sealingly engages a surface of a frustoconical countersink in the corresponding casing part.

2. A seal, according to claim 1, wherein the compressed sealing ring grips the hollow dowel and clamping forces between the casing parts produces a sealing pressure which holds the sealing ring in engagement with the casing parts.

3. A seal, according to claim 2, wherein the ring has the form of a thick, solid washer of elastomeric material chamfered around one edge to provide the frustoconical surface, the washer having an internal circumferential groove separating the first and second webs.

4. A seal, according to claim 3, wherein the second web has an axially facing surface which engages a corresponding axially facing surface of the corresponding casing part.

5. A seal, according to claim 1, wherein the operating oil pressure urges the webs of the sealing ring against the two casing parts.

6. A seal, according to claim 5, wherein the dowel has a radial bore therein for communicating the operating pressure to a location between the first and second webs of the sealing ring.

7. A seal, according to claim 5, wherein the second web rests within a complementary counterbore in the corresponding casing part.

8. A seal, according to claim 1, wherein the dowel has a loose fit in at least one of the casing parts.

* * * * *